United States Patent
Diachina et al.

(10) Patent No.: US 9,451,587 B2
(45) Date of Patent: Sep. 20, 2016

(54) PAGING FOR LONGER PAGING CYCLES

(71) Applicant: Telefonaktiebolaget L M Ericsson (publ), Stockholm (SE)

(72) Inventors: John Walter Diachina, Garner, NC (US); Paul Schliwa-Bertling, Ljungsbro (SE); Martin Israelsson, Spånga (SE); Nicklas Johansson, Brokind (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 119 days.

(21) Appl. No.: 14/267,068

(22) Filed: May 1, 2014

(65) Prior Publication Data

US 2014/0329550 A1    Nov. 6, 2014

Related U.S. Application Data

(60) Provisional application No. 61/819,288, filed on May 3, 2013.

(51) Int. Cl.
| | |
|---|---|
| *H04W 68/00* | (2009.01) |
| *H04W 68/02* | (2009.01) |
| *H04L 29/06* | (2006.01) |
| *H04W 28/02* | (2009.01) |
| *H04W 4/00* | (2009.01) |

(52) U.S. Cl.
CPC ............. *H04W 68/02* (2013.01); *H04L 69/28* (2013.01); *H04W 28/0284* (2013.01); *H04W 68/005* (2013.01); *H04W 4/005* (2013.01); *H04W 28/0289* (2013.01)

(58) Field of Classification Search
USPC .................. 455/432.1, 433, 435.1, 436–439, 455/442–445, 452.2, 458; 370/328–333
See application file for complete search history.

(56) References Cited

U.S. PATENT DOCUMENTS

| | | | |
|---|---|---|---|
| 5,301,225 A | 4/1994 | Suzuki et al. | |
| 5,533,094 A * | 7/1996 | Sanmugam | H04W 68/08 340/7.27 |

(Continued)

FOREIGN PATENT DOCUMENTS

| | | | |
|---|---|---|---|
| EP | 2 696 629 | 2/2014 | ............ H04W 52/02 |
| WO | WO 2011/147358 | 5/2009 | ............ H04W 88/18 |
| WO | WO 2012/137296 | 10/2012 | ............ H04W 84/02 |

OTHER PUBLICATIONS

PCT Notification of Transmittal of the International Preliminary Report on Patentability for International application No. PCT/IB2014/061162, Jul. 29, 2015.

(Continued)

*Primary Examiner* — Dai A Phuong
(74) *Attorney, Agent, or Firm* — Baker Botts, LLP

(57) ABSTRACT

A radio network node receives a page request from a core network node. The page request indicates to page a wireless communication device. The radio network node determines a next occurrence of a monitoring window during which the wireless communication device will monitor a paging channel associated with the radio network node. If the amount of time until the next occurrence of the monitoring window exceeds an amount of time that the radio network node can store the page request, the radio network node discards the page request and sends a response to the core network node indicating that the page request was discarded; the response includes a paging timer value that indicates when the core network node should repeat the page request.

22 Claims, 10 Drawing Sheets

(56) References Cited

U.S. PATENT DOCUMENTS

| | | | | |
|---|---|---|---|---|
| 6,477,382 | B1* | 11/2002 | Mansfield | H04W 68/00 370/311 |
| 7,027,827 | B2* | 4/2006 | Bonta | H04W 16/14 370/310 |
| 2007/0232330 | A1 | 10/2007 | Ranganathan | |
| 2007/0287418 | A1* | 12/2007 | Reddy | H04W 12/02 455/410 |
| 2011/0195709 | A1* | 8/2011 | Christensson | H04W 68/00 455/426.1 |
| 2011/0223942 | A1 | 9/2011 | Xu et al. | |
| 2012/0071157 | A1* | 3/2012 | Markoulidakis | H04W 24/08 455/423 |
| 2013/0170347 | A1* | 7/2013 | Zhang | H04L 47/808 370/230 |
| 2014/0323165 | A1 | 10/2014 | Diachina et al. | |

OTHER PUBLICATIONS

PCT Notification of Transmittal of the International Search Report and the Written Opinion of the International Searching Authority, or the Declaration, with attached PCT Written Opinion of the Int'l Searching Authority; International Application No. PCT/IB2014/061162, file ref No. P40606-WO1, Int'l filing date May 2, 2014 (22 pages), date of mailing Oct. 1, 2014.

Ericsson: "A solution to long paging cycles for MTC devices" (update of GP-140154); 3GPP TSG GERAN#61; Tdoc GP-140193, Feb. 24-28, 2014; Sophia Antipolis, France (11 pgs).

* cited by examiner

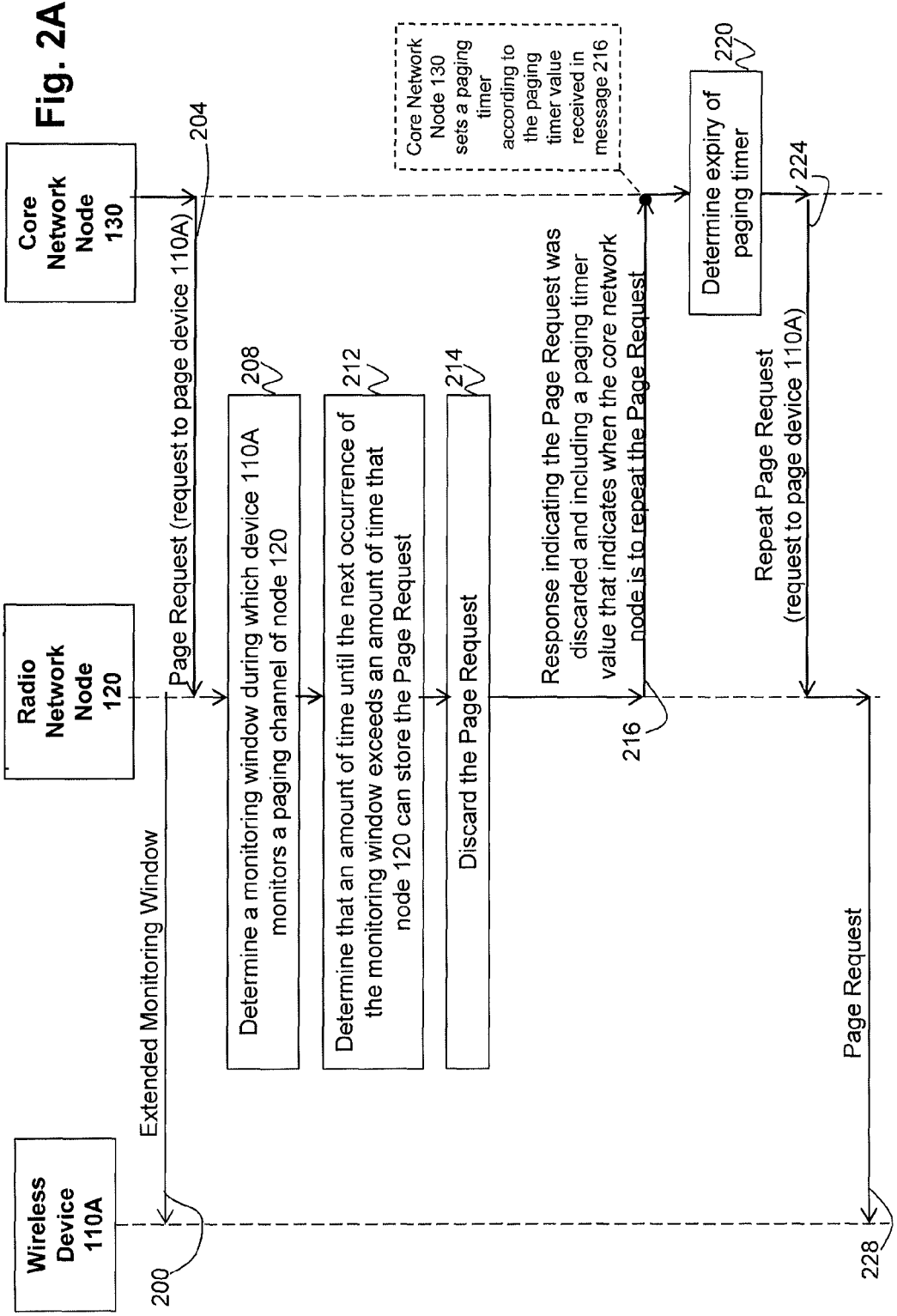

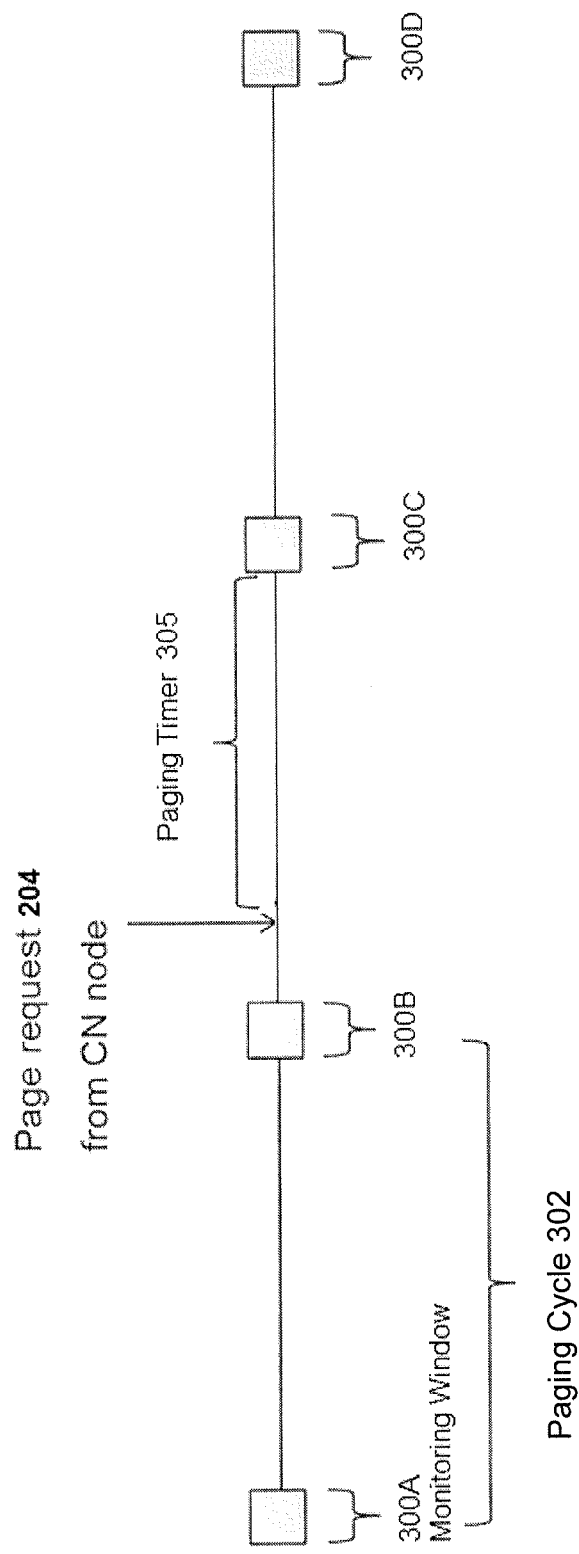

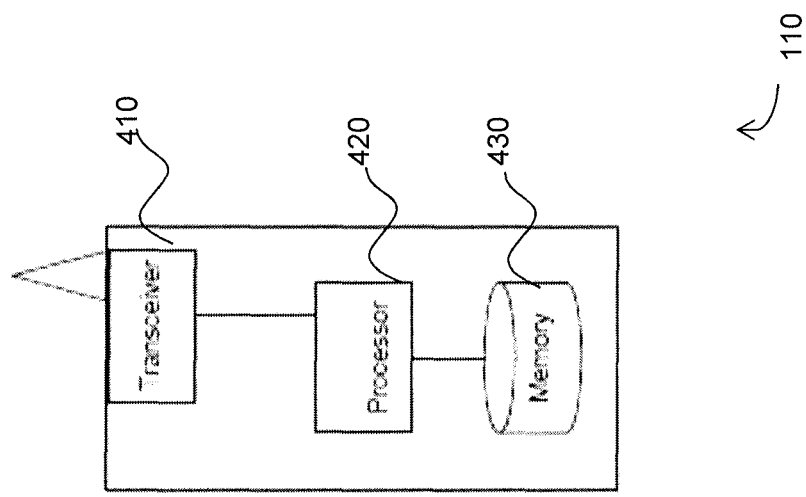

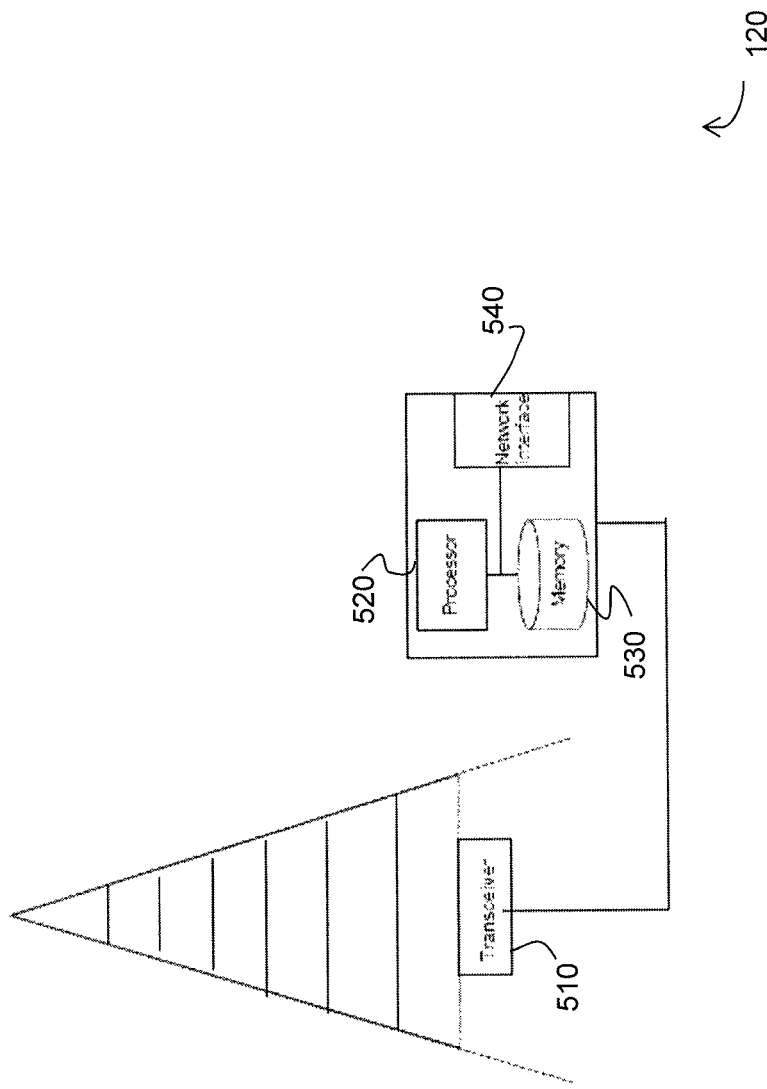

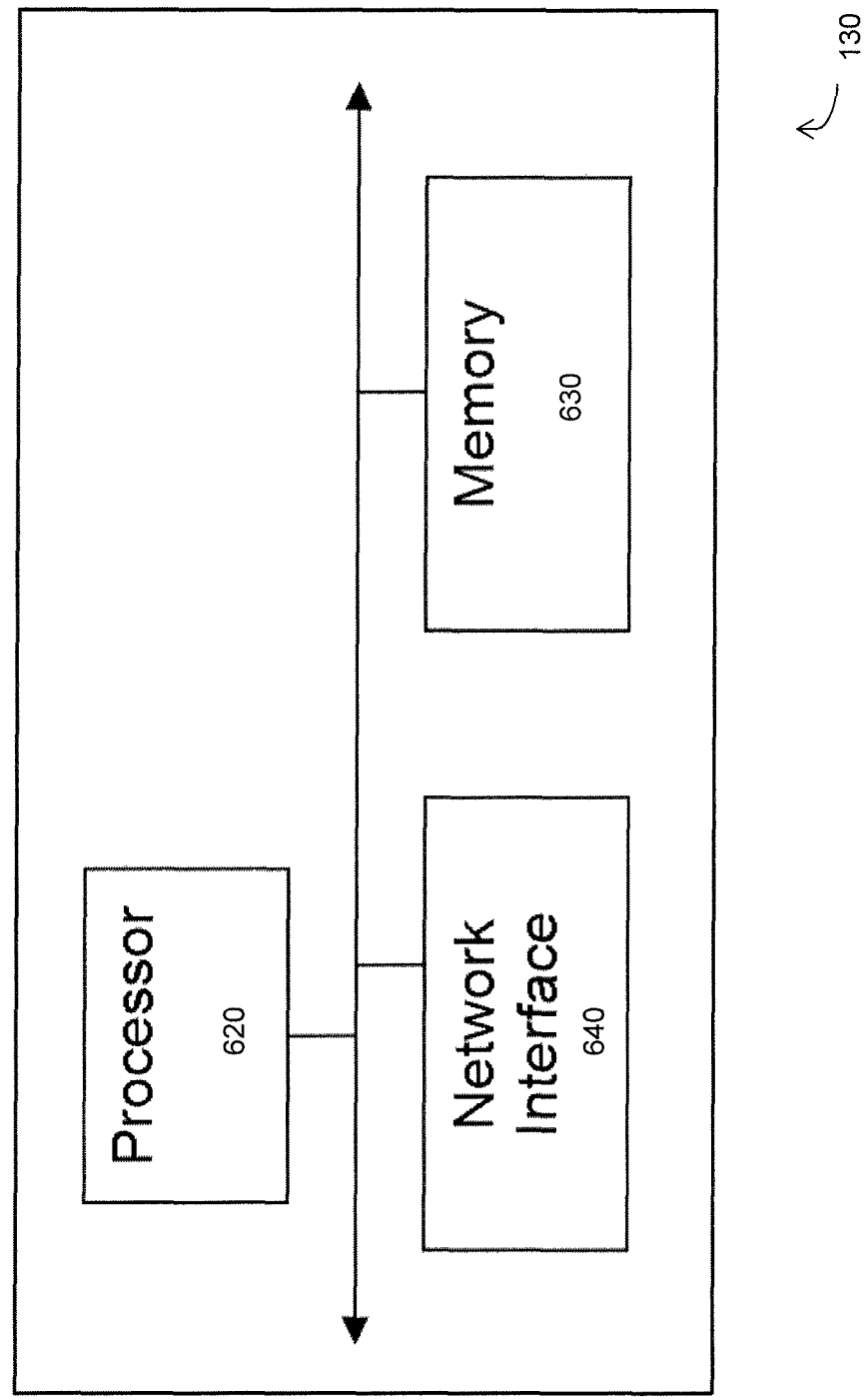

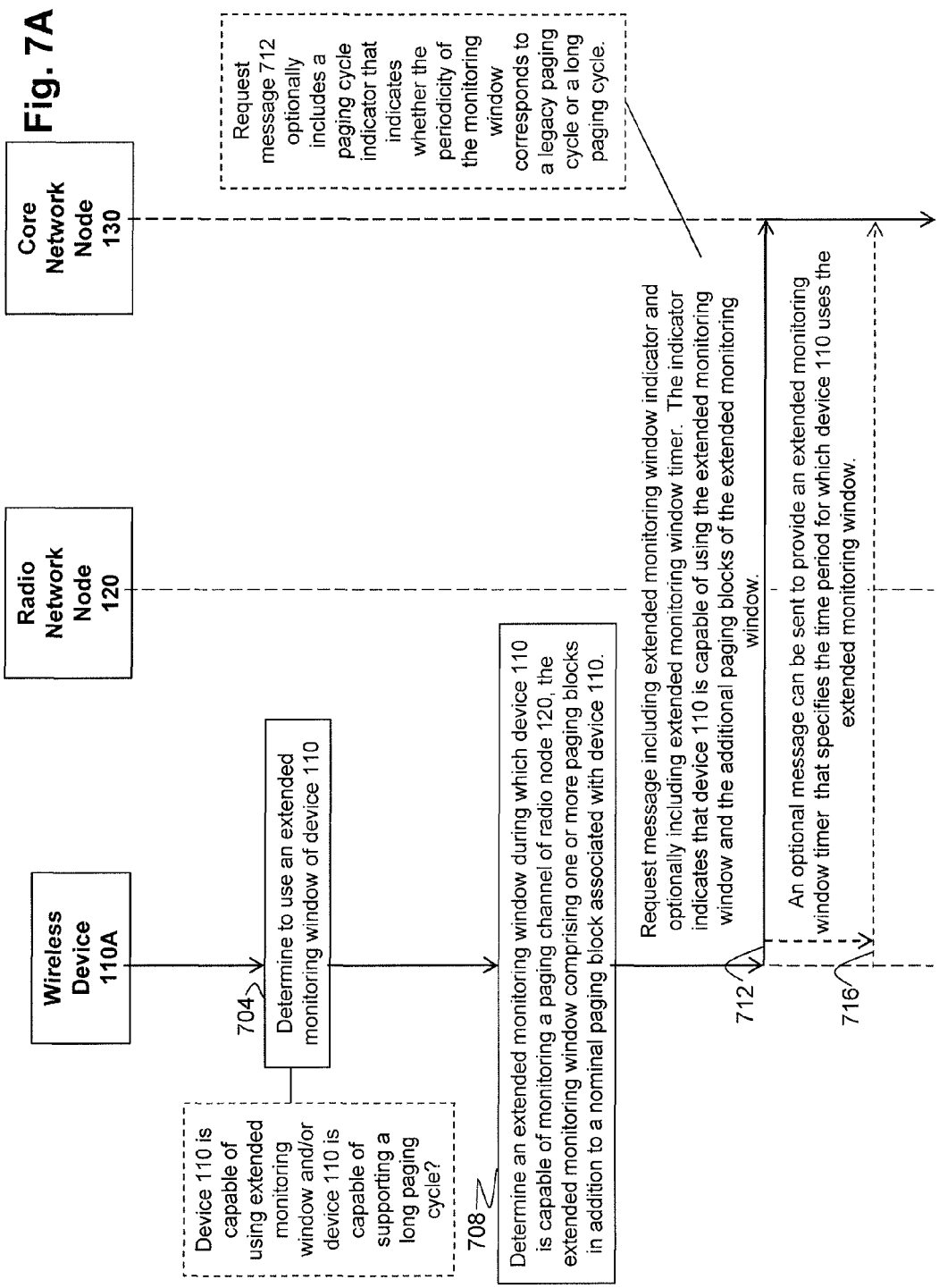

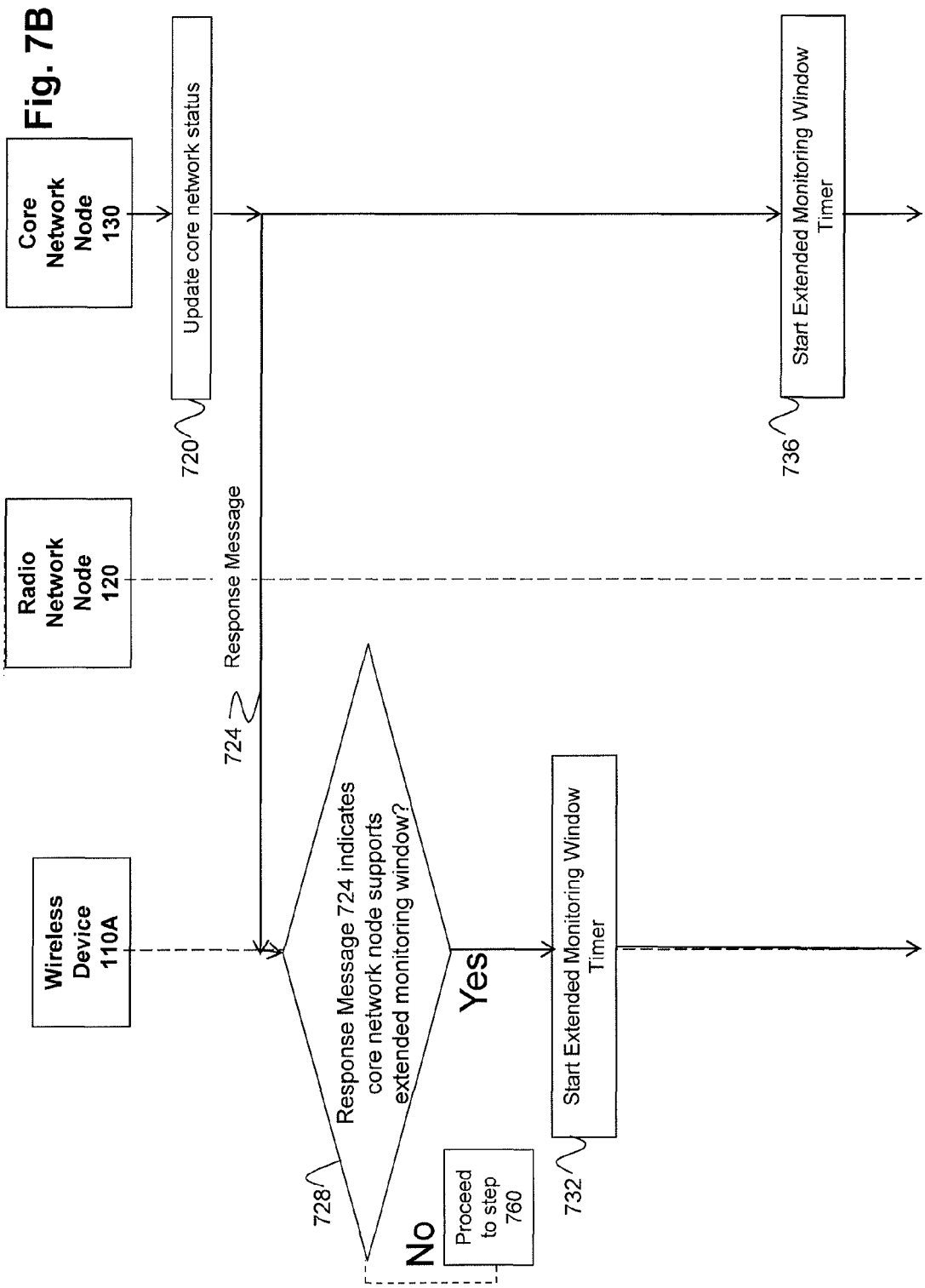

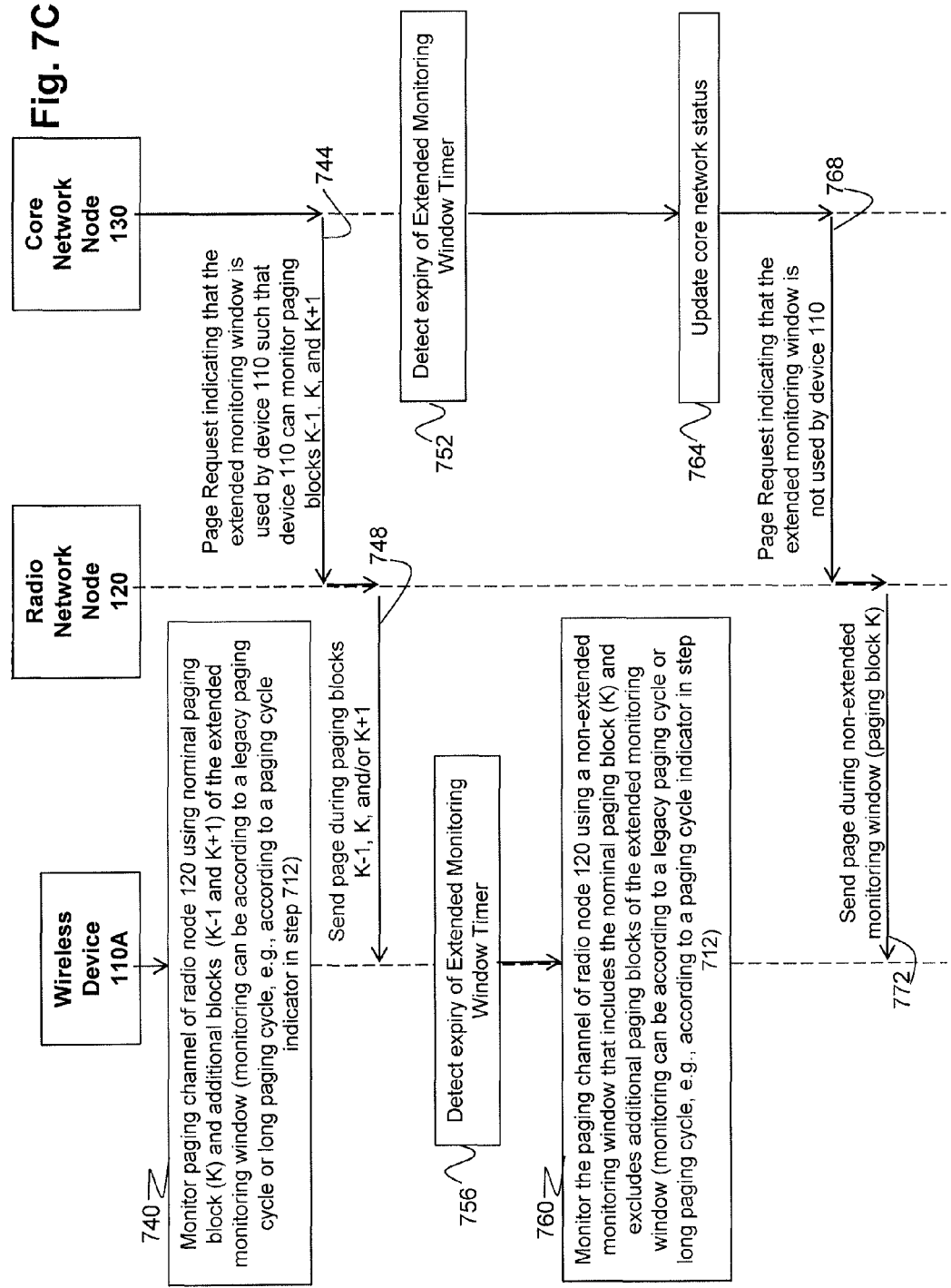

PAGING FOR LONGER PAGING CYCLES

RELATED APPLICATIONS

This application claims the benefit of priority of U.S. Provisional Patent Application No. 61/819,288 filed on May 3, 2013.

TECHNICAL FIELD

The invention relates, in general, to wireless communications and, more particularly, to improved paging for longer paging cycles.

BACKGROUND

In a wireless network, a wireless communication device (e.g., a Mobile Station (MS) or User Equipment (UE)) communicates with one or more radio access nodes to send and/or receive information, such as voice traffic, data traffic, and control signals. In some cases, the radio access node initiates sending information to the wireless communication device via a page request. As an example, the radio access node sends a page request to trigger a corresponding page response from the wireless communication device and thereby acquire knowledge of its precise location as required for a wireless communication device in an idle or dormant state to initiate setting up a traffic channel for sending information to the wireless communication device.

The wireless communication device monitors the radio access node's paging channel according to a paging cycle. Devices running less time critical applications may be able to use a long paging cycle in order to use less energy; a long paging cycle corresponds to a paging cycle longer than what is supported by specification 3GPP TS 44.018 version 12.1.0. In a long paging cycle, the device wakes up to monitor the paging channel less frequently than when a legacy paging cycle is used; a legacy paging cycle corresponds to a paging cycle supported by specification 3GPP TS 44.018 version 12.1.0. For example, a device using a legacy paging cycle wakes up every couple of seconds to monitor the paging channel, whereas a device using a long paging cycle might only wake up every couple of hours, days, or weeks to monitor the paging channel.

The radio network does not necessarily have capacity to store page requests for the duration of a long paging cycle (e.g., hours, days, or weeks). The radio network discards a page request received from the core network if the radio network does not have capacity to store the page request until a device's next monitoring window. In some cases, the core network will retry the page request and the radio network will again discard the page request if the radio network does not have capacity to store the page until a device's next monitoring window. Sending page requests that the radio network discards increases the messaging overhead in the network.

SUMMARY

To address the foregoing problem in the prior art, disclosed is a radio network node that receives a page request from a core network node; the page request indicates to page a wireless communication device. The radio network node determines a next occurrence of a monitoring window during which the wireless communication device will monitor a paging channel associated with the radio network node and, if the amount of time until the next occurrence of the monitoring window exceeds an amount of time that the radio network node can store the page request, the radio network node discards the page request and sends a response to the core network node indicating that the page request was discarded. The response includes a paging timer value that indicates when the core network node should repeat the page request.

According to some embodiments, the core network node receives a response with instructions to repeat the page request according to a paging timer value. The core network node starts a corresponding paging timer and sends the repeat page request to the radio network node in response to the expiry of the paging timer.

Also disclosed is a wireless communication device that monitors a paging channel associated with a radio network node according to a first monitoring window; the periodicity of the first monitoring window corresponds to a long paging cycle, wherein the long paging cycle corresponds to a paging cycle longer than what is supported by specification 3GPP TS 44.018 version 12.1.0. The wireless communication device receives a page request indicating it should use a second monitoring window for a time period T1; the periodicity of the second monitoring window corresponds to a legacy paging cycle. The wireless communication device then monitors the paging channel according to the second monitoring window until the time period T1 elapses and resumes monitoring the paging channel according to the first monitoring window after the time period T1 elapses.

BRIEF DESCRIPTION OF THE DRAWINGS

For a more complete understanding of the present invention and its features and advantages, reference is now made to the following description, taken in conjunction with the accompanying drawings, in which:

FIG. 2A-2B illustrate a signaling diagram for signals between network nodes and devices, and functions embodied therein, in accordance with the principles of the invention;

FIG. 2B is a signaling diagram of an exchange of signals in accordance with the principles of the invention;

FIG. 3 is a block diagram of an exemplary monitoring window for a paging channel;

FIG. 4 is a block schematic of an exemplary wireless communication device suitably operative in accordance with the principles of the invention;

FIG. 5 is a block schematic of an exemplary radio network node suitably operative in accordance with the principles of the invention;

FIG. 6 is a block schematic of an exemplary core network node suitably operative in accordance with the principles of the invention; and, FIGS. 7A-7C illustrate a signaling diagram for an exchange of signals in accordance with the principles of the invention in an embodiment of a network.

DETAILED DESCRIPTION

Figure 1:
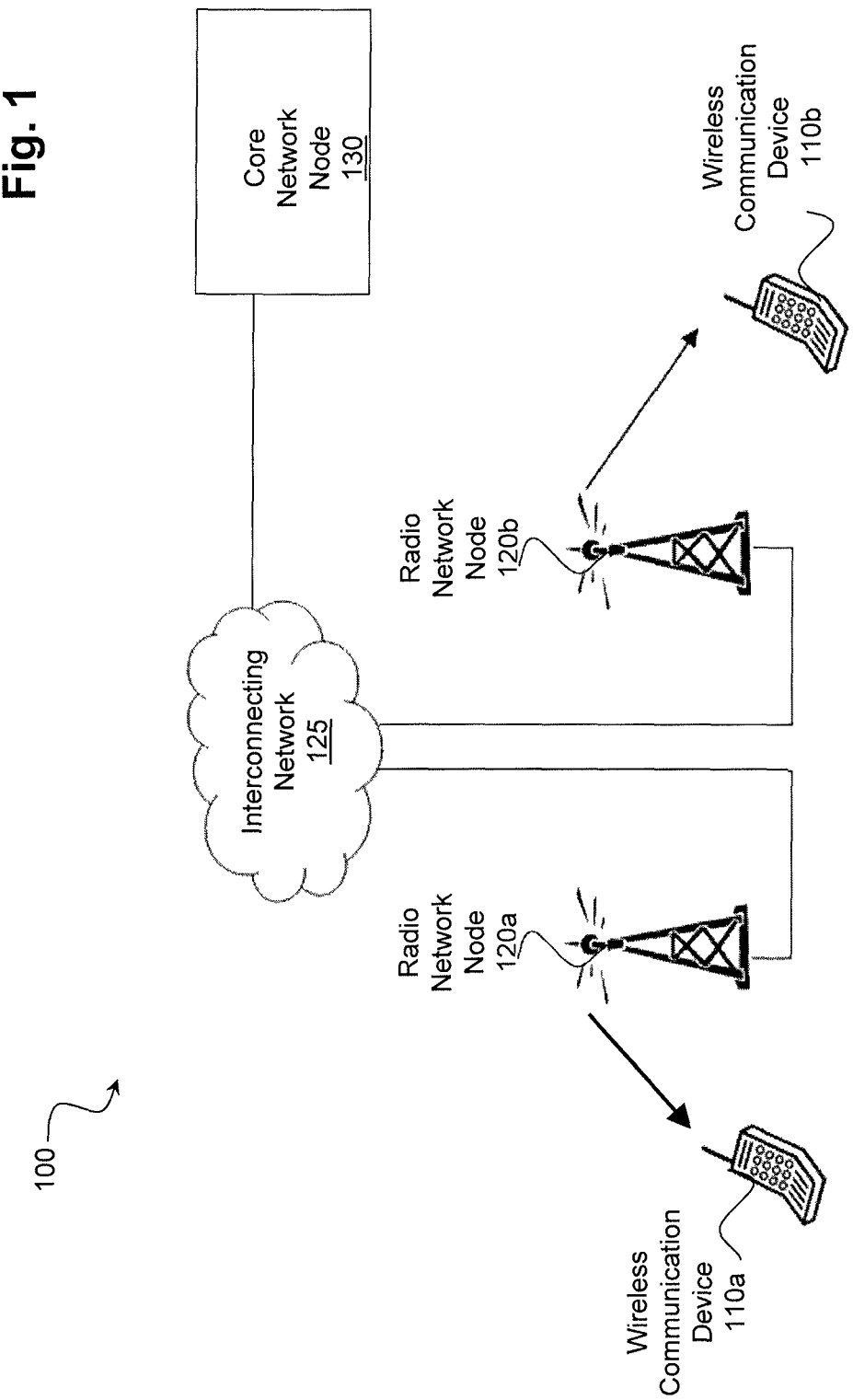
FIG. 1 is a block diagram of an exemplary wireless network.

One major factor that can limit the stand-by time of a wireless communication device is the device's paging cycle. The paging cycle refers to the frequency that the device needs to wake up and monitor the paging channel for page requests. Existing specifications assume that paging is time critical. As a result, a core network node applying these existing specifications will initiate paging as soon as possible after receiving an incoming user plane payload so that the payload can be delivered to the corresponding device as soon as possible. This approach requires a wireless communication device to spend a significant amount of energy monitoring the paging channel just in case one of the page requests is intended for that device. Often times, however, the page requests being monitored turn out to be intended for different devices. Frequent monitoring of the paging channel might not be necessary for less time critical applications, such as certain machine type communication (MTC) applications. To conserve energy, devices running less time critical applications use a long paging cycle. In a long paging cycle, the device wakes up to monitor the paging channel less frequently than when a legacy paging cycle is used.

For longer paging cycles, it is not guaranteed that the radio network node can store a page request until it can be delivered using the next occurrence of the monitoring window associated with the wireless communication device. If the radio network node does not have capacity to store the page, the radio network node must discard the page request. For example, if the wireless communication device being paged will not be monitoring the paging channel for several hours or longer due to long paging cycle operation, the radio network node discards the page request.

Embodiments of the invention provide techniques for handling a page request if a radio network node cannot hold onto a page request until the next occurrence of the monitoring window of the wireless communication device to be paged. For example, in some embodiments, the radio network node informs the core network node that a page request has been discarded and instructs the core network node to repeat the page request at a point in the future closer to the wireless communication device's next monitoring window.

The radio network node provides information to the core network node to enable the core network node to repeat the page request at a time in the future closer to the wireless communication device's next monitoring window. For example, the radio network node typically has better visibility into the device's next monitoring window (based on the device's paging cycle and its nominal paging group and, optionally, its extended paging group). Thus, the radio network node can instruct the core network node to set a timer that will allow the core network node to repeat the page request at an appropriate time.

In some embodiments, the radio network node instructs the core network node to set the timer relative to an extended monitoring window and/or fallback paging cycle for the device. The extended monitoring window includes paging blocks occurring before, following, or both before and following the nominal paging block of the wireless communication device. Using an extended monitoring window increases the likelihood that the device successfully receives a page request during a monitoring window. For example, if paging congestion occurs during the device's nominal paging blocks, the page request can be transmitted (or retransmitted) before or after the nominal paging block to increase the likelihood that the device receives the page request. Using a fallback paging cycle increases the likelihood that the device receives the page request relatively soon because the device monitors the paging blocks more frequently according to a legacy paging cycle rather than a long paging cycle.

The extended monitoring window can be configured by the device (e.g., the device sends the network an indicator that the device is using an extended monitoring window). Alternatively, the extended monitoring window can be configured by the network in paging request messages or in system information. For example, in the event of paging congestion in the radio network node (i.e., an inability to convey the full number of page requests requiring delivery using paging blocks corresponding to the nominal paging groups), the radio network node can instruct a device to use an extended monitoring window. Similarly, the radio network node can instruct the device to fallback to a legacy paging cycle during times of congestion (e.g., until the page request can be delivered, instruct the device to wake up every few seconds, rather than waiting hours, days, or weeks to monitor the paging channel).

The ability to configure an extended monitoring window and/or to fall back to a legacy paging cycle is useful in long paging cycle operation where the penalty for missing a page request can be high due to the amount of time between paging cycles. In some embodiments, the radio network node adds a 3GPP Rel-12 extension to paging messages or sets one or more bits in a Skip Indicator to "one" in order to instruct a wireless communication device to extend the window of paging group monitoring (e.g., multiply the number of paging blocks monitored per paging cycle by a factor of X where the value of X can be sent as part of system information) or to fallback to a legacy paging procedure (e.g., for a predetermined time t1). The number of bits needed depends on the desired granularity of the instruction to extend the monitoring window or to fallback to the legacy paging procedure.

FIG. 1 is a block diagram of an exemplary wireless network 100 that includes one or more wireless communication devices 110 and a plurality of network nodes. The network nodes include radio network nodes 120 and core network nodes 130. In the example, wireless communication device 110a communicates with radio network node 120a over a wireless interface. For example, wireless communication device 110a transmits wireless signals to radio network node 120a and/or receives wireless signals from radio network node 120a. The wireless signals contain voice traffic, data traffic, and control signals.

A radio network node 120 refers to any suitable node of a radio access network (RAN)/base station subsystem (BSS). Examples include a radio access node (such as a base station or eNodeB) and a radio access controller (such as a base station controller or other node in the radio network that manages radio access nodes). Radio network node 120 interfaces (directly or indirectly) with core network node 130, for example, via an interconnecting network 125. Interconnecting network 125 refers to any interconnecting system capable of transmitting audio, video, signals, data, messages, or any combination of the preceding.

Core network node 130 manages the establishment of communication sessions and various other functionality for wireless communication device 110. Wireless communication device 110 exchanges certain signals with core network node 130 using a non-access stratum (NAS) layer. Using NAS signaling, signals between wireless communication device 110 and core network node 130 pass transparently through radio network nodes 120. Examples of wireless communication device 110, radio network node 120, and core network node 130 are described with respect to FIGS. 4, 5, and 6, respectively.

In general, embodiments of network 100 disclosed herein ensure successful reception/decoding of a paging message intended for a wireless communication device 110 that is using a longer paging cycle and/or extended paging group monitoring. In some embodiments, if radio network node 120 determines that a page request cannot be delivered to wireless communication device 110, radio network node 120 provides core network node 130 with a timer value indicating when it is appropriate (from the point of view of core network node 130) to repeat the page request.

In some embodiments, when paging congestion occurs in the radio access network, radio network node 120 includes a paging congestion indicator in paging messages. This indicator allows wireless communication devices 110 supporting longer paging cycles to take appropriate actions to increase the probability of receiving a page request. As an example, wireless communication device 110 can switch from non-extended monitoring window operation to extended monitoring window operation during which device 110 reads its nominal paging block plus additional paging blocks occurring before and/or after its nominal paging block. As another example, wireless communication device 110 can switch from a long paging cycle to a legacy paging cycle until the congestion has cleared.

In some embodiments, new procedures and information elements enable core network nodes 130 to communicate with the service layer entities notifying them about the time frame for which devices will be available for network initiated (device terminated) communication over the radio interface. For example, this can be achieved by enhancing the interface between the SGSN/MME (Serving GPRS Support Node/Mobility Management Entity), and the MTC-IWF (Inter-Working Function) and consequently the interface between the MTC-IWF and the SCS/AS (Service Capability Server/Application Server). Thus, for example, in some embodiments, core network node 130 receives timer information from radio network node 120 and, in turn, provides the timer information to a service layer entity.

Figure 2B:
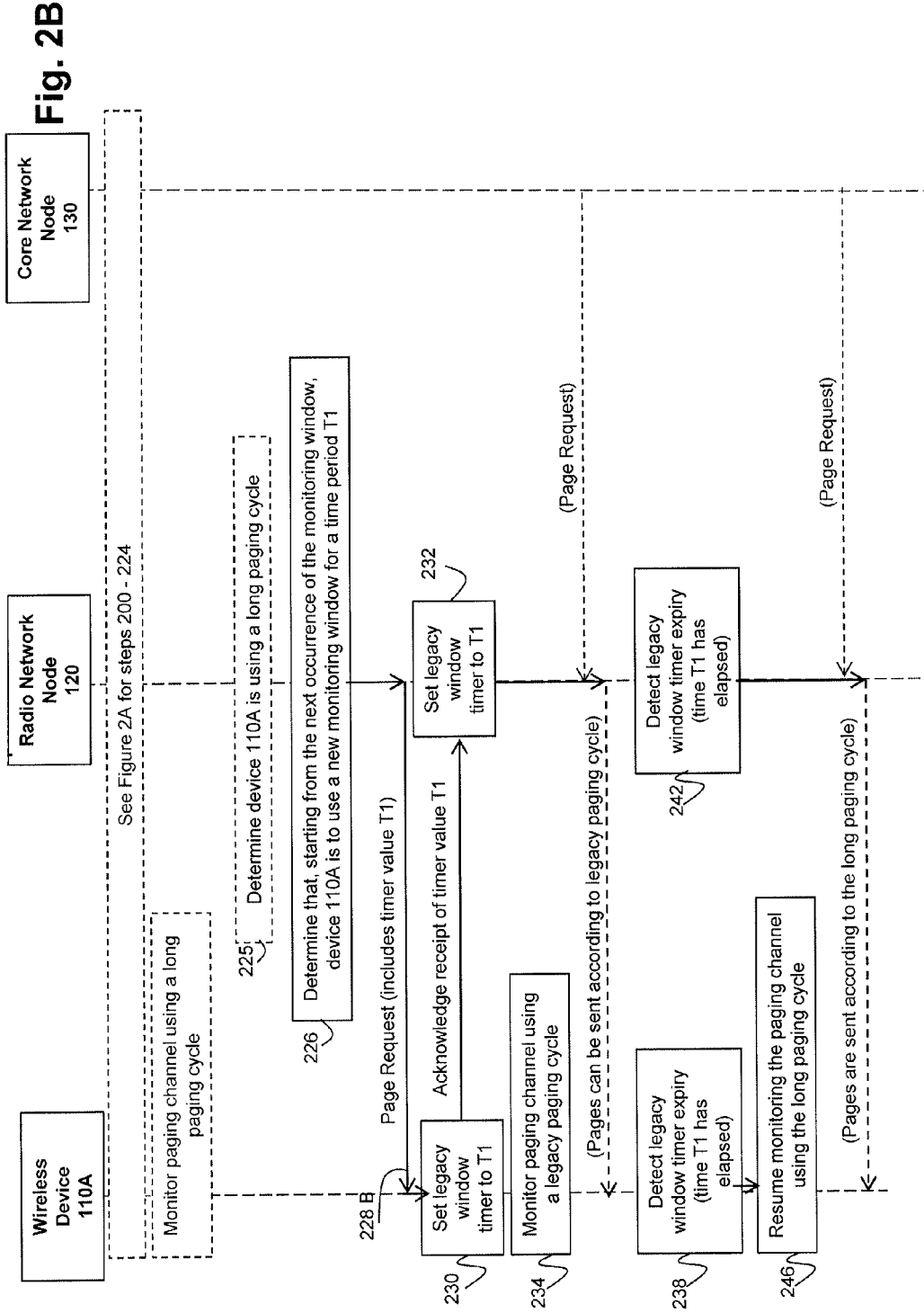

FIGS. 2A-2B illustrate a signaling diagram for signals between nodes and devices, and functions embodied therein, in an embodiment of network 100. In the example, the signals are exchanged among a wireless communication device 110 (such as a UE), a radio network node 120 (such as a radio access node and/or a radio network controller), and a core network node 130 (such as an SGSN).

In some embodiments, radio network node 120 optionally instructs wireless communication device 110A to use an extended monitoring window at step 200. For example, radio network node 120 can instruct wireless communication device 110A to use an extended monitoring window during times of paging channel congestion. Using an extended monitoring window tends to increase the probability of wireless communication device 110A successfully receiving page requests compared to using a monitoring window consisting only of device 110A's nominal paging block. Radio network node 120 sends the instruction to use the extended monitoring window in a page request message or in system information. The instruction may include a value X indicating a number of early paging blocks and/or a value Y indicating a number of late paging blocks to be monitored by wireless communication device 110A. The blocks of the extended monitoring window can be consecutive (the early paging blocks occur immediately before device 110A's nominal paging block and the late paging blocks occur immediately following device 110A's nominal paging block) or non-consecutive.

At step 204, radio network node receives a page request from a core network node. The page request indicates to page wireless communication device 110A. At step 208, radio network node determines a next occurrence of a monitoring window during which wireless communication device 110A will monitor a paging channel associated with radio network node 120. Radio network node 120 determines the next occurrence of the monitoring window based on the blocks monitored by wireless communication device 110A (the nominal paging block and, if device 110 is using an extended monitoring window, the additional paging blocks of the extended monitoring window) and wireless communication device 110A's paging cycle (the periodicity with which device 110A monitors the monitoring window). The paging cycle can correspond to a legacy paging cycle where the time between monitoring windows is on the order of a few seconds; alternatively, the paging cycle corresponds to a long paging cycle where the time between monitoring windows is longer than that of the legacy paging cycle. For example, in a long paging cycle, the time between monitoring windows can be hours, days, or weeks. See e.g., U.S. Patent Publication No. 2011/0195709, entitled "Method and Arrangement in a Telecommunication System" by Christensson, et al.

The blocks monitored during each paging cycle include wireless communication device 110A's nominal paging group. If wireless communication device 110A is using an extended monitoring window, then the blocks monitored include X early paging blocks and/or Y late paging blocks. Wireless communication device 110A uses an extended monitoring window based on receiving an instruction from radio network node 120 (step 200); alternatively, wireless communication device 110A uses an extended monitoring window by default or based on a decision made by wireless communication device 110A and communicated to the core network node 130 (e.g. using NAS signaling). Thus, in some embodiments, wireless communication device 110A sends an indicator to core network node 130 indicating its use of the extended monitoring window and core network node 130 relays this indicator to radio network node 120 when sending page requests intended for wireless communication device 110A. The indicator can include the values for X (early paging blocks) and Y (late paging blocks) monitored by wireless communication device 110A. An example of a method using the indicator is illustrated in, and described with reference to, FIGS. 7A-7C.

At step 212, radio network node 120 determines that an amount of time until the next occurrence of wireless communication device 110A's monitoring window exceeds an amount of time that radio network node 120 can store the page request. As an example, if radio network node 120 can buffer page requests for up to one minute and wireless communication device 110A's next paging cycle occurs in three hours, radio network node 120 determines that the amount of time until the next occurrence of wireless communication device 110A's monitoring window exceeds the amount of time that radio network node 120 can store the page request. If radio network node 120 cannot store the page request until wireless communication device 110A's next monitoring window, it discards the page request without delivering the page request to wireless communication device 110A (step 214).

At step 216, radio network node 120 sends a response to core network node 130. The response indicates that radio network node 120 discarded the page request without sending the page request to wireless communication device 110A. The indication may be explicit; for example, radio network node 120 can send a response with a rejection code that corresponds to discarding a page request. Alternatively, the indication can be implicit; for example, radio network node 120 can send a response including a paging timer value that indicates when core network node 130 is to repeat the page request. The indication to repeat the page request according to the paging timer value implicitly indicates that the page request was discarded and was not delivered to wireless communication device 110A.

In some embodiments, radio network node 120 configures the paging timer to enable core network node 130 to repeat the page request when the amount of time until the next occurrence of the monitoring window is less than the amount of time that the radio network node can store the page request. Continuing with the example above, if radio network node 120 can buffer page requests for up to one minute and wireless communication device 110A's next paging cycle occurs in three hours, radio network node 120 can configure the paging timer in order to receive the repeat page request from core network node 130 in 2 hours, 59 minutes, and n seconds in the future (where n is less than 60 seconds).

Radio network node 120 sends either an explicit paging timer value or an implicit paging timer value to core network node 130. An explicit paging timer value indicates to repeat the page request at an explicit time, such as 8:05 AM. The explicit time can be identified with any suitable granularity, such as one or more of date, hour, minute, second, millisecond, time zone/GMT offset, etc. An implicit paging timer value indicates a delta between the time when core network node 130 receives the response and the time when core network node 130 is to repeat the page request, such as 2 hours, 59 minutes, and n seconds from receipt of the response. The implicit time can be identified with any suitable granularity, such as one or more of days, hours, minutes, seconds, milliseconds, etc.

Radio network node 120 can determine the paging timer value based on the paging blocks monitored by wireless communication device 110A. So, if at step 208 radio network node 120 determined that the monitoring window corresponds to device 110A's nominal paging block, radio network node 120 sets the paging timer value for core network node 130 to repeat the page request prior to the next occurrence of the nominal paging block. In some embodiments, if at step 208 radio network node determined that device 110A's monitoring window corresponds to an extended monitoring window with X early paging blocks, radio network node 120 sets the paging timer value for core network node 130 to repeat the page request prior to the next occurrence of the early paging blocks X. In some embodiments, radio network node 120 adjusts the paging timer based on the load in the radio access network. For example, during times that the radio access network is lightly loaded, radio network node 120 may have capacity to receive the repeat page request earlier/store the repeat page request longer than during the times that the radio access network is congested.

After receiving the paging timer value from radio network node 120 (e.g., a node in the base station system), core network node 130 (e.g., an MME or SGSN) can forward the timer value to the service layer, for example, through the MTC-IWF to the SCS/AS. This may enable the transmission of subsequent page requests that trigger device terminated communication to be re-attempted approximately when wireless communication device 110A is accessible according to its monitoring window. Thus, the core network sets a paging timer according to the paging timer value received in step 216.

At step 220, core network node 130 detects the expiry of the paging timer. Continuing with the previous example, core network node 130 detects the expiry of the paging timer at 8:05 AM (in the embodiment using the explicit timer value) or after 2 hours, 59 minutes, and n seconds have elapsed (in the embodiment using the implicit timer value). In response to the expiry of the paging timer, core network node 130 repeats the page request at step 224. The repeat page request sent at step 224 includes the same information as the original page request that was sent at step 204. For example, the repeat page request identifies wireless communication device 110A as the device to be paged.

Radio network node 120 receives the repeat page request from core network node 130 and determines that the amount of time until the next occurrence of the monitoring window is less than the amount of time that radio network node 120 can store the page request. As an example, radio network node 120 may determine that the amount of time until the next occurrence of the monitoring window is 30 seconds and that the amount of time that radio network node can store the page request is 1 minute. Thus, radio network node 120 stores the page request prior to the monitoring window and pages wireless communication device during the monitoring window at step 228.

Steps 200-224 of FIG. 2B are similar to those described with respect to FIG. 2A. When the method of FIG. 2B begins, wireless communication device 110A is monitoring the paging channel using a long paging cycle, wherein the long paging cycle corresponds to a paging cycle longer than what is supported by specification 3GPP TS 44.018 version 12.1.0. The periodicity of the long paging cycle could be on the order of hours, days, or weeks. At step 225 radio network node 120 determines that device 110A's monitoring window has a periodicity that corresponds to a long paging cycle. Radio network node 120 can determine the periodicity of device 110A's paging cycle based on an indicator received from wireless communication device 110A or based on information stored by the network.

At step 226, radio network node 120 determines that, starting from the next occurrence of the monitoring window, wireless communication device 110A is to use a new monitoring window for a limited time period T1. The new monitoring window has a periodicity that corresponds to a legacy paging cycle (e.g., on the order of a couple of seconds). In some embodiments, radio network node 120 determines to use the legacy paging cycle during times of congestion (e.g., until a backlog of page requests can be delivered, instruct the device to wake up every few seconds, rather than waiting hours, days, or weeks to monitor the paging channel). Alternatively, radio network node 120 can determine to use a legacy paging cycle during times that it is experiencing a high frequency of discards with respect to page requests from core network node 130 to device 110A (e.g., if radio network node 120 has discarded a number n of consecutive page requests to device 110A or if radio network node 120 has discarded a number m page requests to device 110A within a pre-determined period of time).

At step 228B, radio network node 120 pages wireless communication device 110A during the next occurrence of the monitoring window (e.g., to send the repeat page request of step 224). The page request includes the value of the time period T1 during which wireless communication device 110A is to use the new monitoring window with the legacy paging cycle.

At step 230, wireless communication device 110A optionally sends radio network node 120 an acknowledgment that device 110A received and will use timer value T1. Wireless communication device 110A then sets its legacy window timer to T1. At step 232, radio network node 120 receives the acknowledgment and sets its legacy window timer to T1. At step 234, wireless communication device 110A monitors the paging channel according to the new monitoring window. Thus, wireless communication device 110A wakes up on the order of every couple of seconds (according to the legacy paging cycle) to monitor the paging channel for page requests. Radio network node 120 then pages wireless communication device 110A according to the legacy paging cycle. At step 238 and 242, wireless communication device 110A and radio network node 120 detect the expiry of their respective legacy window timers. At step 246, wireless communication device 110A resumes monitoring the paging channel according to the original monitoring window (according to the long paging cycle). Thus, wireless communication device 110A wakes up on the order of hours, days, or weeks. After expiry of the legacy window timer, radio network node 120 pages wireless communication device 110A according to the long paging cycle.

FIG. 3 is a block diagram of an exemplary monitoring window for a paging channel. As shown in FIG. 3, wireless communication device 110 monitors a paging channel associated with radio network node 120 during monitoring windows 300A, 300B, 300C, and 300D. Monitoring window 300 includes wireless communication device 110's nominal paging block.

If wireless communication device 110 is using an extended monitoring window, monitoring window 300 also includes X paging blocks before and/or Y paging blocks after the nominal paging block. In some embodiments, the extended monitoring window includes a number of consecutive paging blocks adjacent to a nominal paging block associated with wireless communication device 110. The adjacent paging blocks refer to additional paging blocks to be monitored by device 110 (in addition to the nominal paging block). Any suitable number of adjacent paging blocks can be used (e.g., 1, 2, 3, . . . n paging blocks). The adjacent paging blocks occur immediately before, immediately after, or a combination of immediately before and immediately after the nominal paging block such that all paging blocks monitored are contiguous, wherein the nominal paging block can occur anywhere in the set of contiguous paging blocks. In other embodiments, the extended monitoring window includes one or more non-adjacent paging blocks such that one or more unmonitored paging blocks occur between the nominal paging block and the additional block(s) of the extended monitoring window.

Monitoring windows 300A-D are spaced according to a paging cycle 302. Paging cycle 302 refers to the amount of time from one monitoring window to the next monitoring window, such as the amount of time from monitoring window 300A to monitoring window 300B, the amount of time from monitoring window 300B to monitoring window 300C, and so on. Paging cycle 302 can be configured as a legacy paging cycle (e.g., the time between monitoring windows 300 is on the order of a few seconds) or a long paging cycle (e.g., the time between monitoring windows 300 is longer than legacy paging, such as hours, days, or weeks between monitoring windows).

As an example of a legacy paging cycle, a GSM case is considered wherein a number of parameters allow for determining how frequently a wireless communication device wakes up to read paging messages (i.e., the paging cycle) and which radio block in particular a wireless communication device will read within the context of a given paging cycle (i.e., the wireless communication device's paging group). For example, consider the case where the Total Number of radio blocks per 51-multiframe=10, where a Broadcast Control Channel (BCCH) uses 1 radio block per 51-multiframe. Assuming BCCH-Extended is not used, this leaves 9 radio blocks per 51-multiframe for the Paging Channel (PCH)+the Access Grant Channel (AGCH). Base Station Access Grant Blocks Reserved (BS_AG_BLK-S_RES) determines how many radio blocks are reserved for AGCH (range from 0 to 7). This means the number of paging blocks per 51-multiframe=9−BS_AG_BLKS_RES (range from 9 to 2). Base Station Paging Periodicity in Multiframes (BS_PA_MFRMS) indicates the periodicity for transmission of PAGING REQUEST messages to the same paging subgroup and it ranges from 2 to 9. The "available" paging blocks per Common Control Channel (CCCH) are then those "available" per 51-multiframe on that CCCH multiplied by BS_PA_MFRMS (range from 2 to 9)=N. The number of different paging subchannels on the CCCH=(9-BS-AG-BLKSRES)*BS-PA-MFRMS (i.e., N ranges from 4 to 81). Base Station Common Control Channels (BS_C-C_CHANS) is the number of common control channels in a cell (range 1 to 4). Common Control Channel Group (CCCH_GROUP) (0 . . . BS_CC_CHANS-1)=((IMSI mod 1000) mod (BS_CC_CHANS×N)) div N=Paging Channel. PAGING_GROUP (0 . . . N−1)=((IMSI mod 1000) mod (BS_CC_CHANS×N)) mod N=Paging Group. Paging group is simply the paging block a wireless communication device reads on its assigned CCCH once every BS_PA_MFRMS 51-multiframes. Wireless communication devices are therefore required to monitor every Nth block of their paging channel, where N equals the number of available blocks in total on the paging channel of the specific CCCH which their CCCH_GROUP is required to monitor. Which of these N blocks a wireless communication device monitors is determined by the PAGING_GROUP calculation above, and all the wireless communication devices listening to a particular paging block in the set of N blocks in total are defined as being in the same PAGING_GROUP. A wireless communication device that follows this procedure can be said to use the legacy paging procedure. A wireless communication device that uses a monitoring interval that is longer than stated by the parameter BS-PA-MFRMS can be said to use a long paging cycle.

In FIG. 3, core network node 130 sends radio network node 120 a page request 204. Page request 204 is to be delivered to a wireless communication device 110. Radio network node 120 determines that it does not have capacity to store page request 204 until the next occurrence of device 110's monitoring window, here, monitoring window 300C. Radio network node 120 instructs core network node 130 to repeat page request 204 upon expiry of a paging timer 305. Paging timer 305 is configured so that core network node 130 repeats page request 204 closer to monitoring window 300C.

As described with respect to FIG. 1, embodiments of network 100 can include one or more wireless communication devices 110, and one or more different types of network nodes capable of communicating (directly or indirectly) with wireless communication devices 110. Examples of the network nodes include radio network nodes 120 and core network nodes 130. The network may also include any additional elements suitable to support communication between wireless communication devices 110 or between a wireless communication device 110 and another communication device (such as a landline telephone).

Wireless communication device 110, radio network node 120, and core network node 130 use any suitable radio access technology, such as long term evolution (LTE), LTE-Advanced, UMTS, HSPA, GSM, cdma2000, WiMax, WiFi, another suitable radio access technology, or any suitable combination of one or more radio access technologies. For purposes of example, various embodiments may be described within the context of certain radio access technologies. The scope of the disclosure, however, is not limited to the examples and other embodiments could use different radio access technologies. Each of wireless communication device 110, radio network node 120, and core network node 130 include any suitable combination of hardware and/or software. Examples of particular embodiments of wireless communication device 110, radio network node 120, and core network node 130 are described with respect to FIGS. 4, 5, and 6 below, respectively.

FIG. 4 is a block schematic of an exemplary wireless communication device 110 suitably operative in accordance with the principles of the invention. Examples of wireless communication device 110 include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, or any other device that can provide wireless communication. Wireless communication device 110 includes transceiver 410, processor 420, and memory 430. In some embodiments, transceiver 410 facilitates transmitting wireless signals to and receiving wireless signals from radio network node 120 (e.g., via an antenna), processor 420 executes instructions to provide some or all of the functionality described herein as provided by a wireless communication device 110, and memory 430 stores the instructions executed by processor 420.

Processor 420 includes any suitable combination of hardware and software implemented in one or more integrated circuits or modules to execute instructions and manipulate data to perform some or all of the described functions of wireless communication device 110. Memory 430 is generally operable to store computer executable code and data. Examples of memory 430 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

Other embodiments of wireless communication device 110 include additional components (beyond those shown in FIG. 4) responsible for providing certain aspects of the wireless communication device's functionality, including any of the functionality described above and/or any additional functionality (including any functionality necessary to support the solution described above).

FIG. 5 is a block schematic of an exemplary radio network node 120 suitably operative in accordance with the principles of the invention. Radio network node 120 can be, for example, a radio access node, such as an eNodeB, a node B, a base station, a wireless access point (e.g., a Wi-Fi access point), a low power node, a base transceiver station (BTS), a transmission point or node, a remote RF unit (RRU), or a remote radio head (RRH). Other radio network nodes 120, such as one or more radio network controllers, can be configured between the radio access nodes and core network nodes 130. Such other radio network nodes 120 can include processors, memory, and interfaces similar to those described with respect to FIG. 5; such other radio network nodes, however, might not necessarily include a wireless interface, such as transceiver 510.

Radio network node 120 includes at least one processor 520, at least one memory 530, and at least one network interface 540; in certain embodiments, radio network node 120 can also include a transceiver 510. Transceiver 510 facilitates transmitting wireless signals to and receiving wireless signals from wireless communication device 110 (e.g., via an antenna); processor 520 executes instructions to provide some or all of the functionality described above as being provided by a radio network node 120; memory 530 stores the instructions executed by processor 520; and network interface 540 communicates signals to backend network components, such as a gateway, switch, router, Internet, Public Switched Telephone Network (PSTN), other radio network nodes 120, and/or core network nodes 130. The processor 520 and memory 530 can be of the same types as described supra with respect to FIG. 4.

In some embodiments, network interface 540 is communicatively coupled to processor 520 and refers to any suitable device operable to receive input for radio network node 120, send output from radio network node 120, perform suitable processing of the input or output or both, communicate to other devices, or any combination of the preceding. Network interface 540 includes appropriate hardware (e.g., port, modem, network interface card, etc.) and software, including protocol conversion and data processing capabilities, to communicate through a network.

Other embodiments of radio network node 120 include additional components (beyond those shown in FIG. 5) responsible for providing certain aspects of the radio network node's functionality, including any of the functionality described above and/or any additional functionality (including any functionality necessary to support the solution described above). The various different types of radio access nodes may include components having the same physical hardware but configured (e.g., via programming) to support different radio access technologies, or may represent partly or entirely different physical components.

FIG. 6 is a block schematic of an exemplary core network node 130 suitably operative in accordance with the principles of the invention. Examples of a core network node 130 include, but are not limited to, a mobile switching center (MSC), a serving GPRS support node (SGSN), a mobility management entity (MME), a radio network controller (RNC), a base station controller (BSC). Core network node 130 includes processor 620, memory 630, and network interface 640. Processor 620 executes instructions to provide some or all of the functionality described above as being provided by core network node 130; memory 630 stores the instructions executed by processor 620; and network interface 640 communicates signals to other network nodes. The processor 620 and memory 630 can be of the same types as described supra with respect to FIG. 4.

In some embodiments, network interface 640 is communicatively coupled to processor 620 and may refer to any suitable device operable to receive input for core network node 130, send output from core network node 130, perform suitable processing of the input or output or both, communicate to other devices, or any combination of the preceding. Network interface 640 includes appropriate hardware (e.g., port, modem, network interface card, etc.) and software, including protocol conversion and data processing capabilities, to communicate through a network. Other embodiments of core network node 130 include additional components (beyond those shown in FIG. 6) responsible for providing certain aspects of the core network node's functionality, including any of the functionality described above and/or any additional functionality (including any functionality necessary to support the solution described above).

FIGS. 7A-7C illustrate a signaling diagram for an exchange of signals in accordance with the principles of the invention in an embodiment of network 100. In some embodiments, the signals are exchanged among a wireless communication device 110 (such as a UE), a radio network node 120 (such as a node of a base station system), and a core network node 130 (such as an SGSN).

In FIG. 7A, wireless communication device 110 determines to use an extended monitoring window at step 704. Wireless communication device 110 may determine to use the extended monitoring window if wireless communication device 110 supports extended monitoring capability. In some embodiments, extended monitoring capability is a default capability of wireless communication device 110. Alternatively, extended monitoring window capability can be a configured capability. As an example, wireless communication device 110 can determine whether to configure/enable an extended monitoring window based on an indication of whether or not the radio access network serving device 110 supports the transmission of page requests using paging blocks preceding and/or following device 110's nominal paging block. In some embodiments, the system information from the radio access network is enhanced to include such an indication. As another example, wireless communication device 110 can determine whether to configure/enable an extended monitoring window as part of a registration procedure. As another example, wireless communication device 110 can determine to configure/enable an extended monitoring window if device 110 is using a long paging cycle. The long paging cycle uses a periodicity of nominal paging blocks that exceeds that of a legacy paging cycle. In some embodiments, the legacy paging cycle corresponds to a paging cycle supported by specification 3GPP TS 44.018 version 12.1.0 (e.g., the specification specifies a legacy periodicity of nominal paging blocks). The legacy paging cycle is described in more detail with respect to FIG. 3 above. Step 704 is optional and can be skipped, for example, if wireless communication device 704 automatically uses the extended monitoring.

At step 708, wireless communication device 110 determines the extended monitoring window during which device 110 is capable of monitoring a paging channel of radio node 120. The extended monitoring window comprises one or more paging blocks in addition to a nominal paging block associated with device 110. The nominal paging block refers to the paging block that wireless communication device 110 is assigned to monitor. The nominal paging block may be device 110's paging group determined according to a legacy specification, such as 3GPP TS 44.018 version 12.1.0 wherein periodicity of the nominal paging block can be in the area of seconds. Alternatively, in some embodiments, device 110's paging group can be determined using extensions to the legacy specification wherein periodicity of the nominal paging block can be in the area of days or weeks (see e.g., U.S. Patent Publication No. 2011/0195709, entitled "Method and Arrangement in a Telecommunication System" by Christensson, et al.).

In some embodiments, the extended monitoring window includes a number of consecutive paging blocks adjacent to a nominal paging block associated with wireless communication device 110. The adjacent paging blocks refer to additional paging blocks to be monitored by device 110 (in addition to the nominal paging block). Any suitable number of adjacent paging blocks can be used (e.g., 1, 2, 3, . . . n paging blocks). The adjacent paging blocks occurs immediately before, immediately after, or a combination of immediately before and immediately after the nominal paging block such that all paging blocks monitored are contiguous wherein the nominal paging block can occur anywhere in the set of contiguous paging blocks. As one example, the monitoring window may include the nominal paging block (K) and the extended monitoring window, where the extended monitoring window includes one paging block immediately before the nominal paging block (X=K−1) and one paging block immediately after the nominal paging block (Y=K+1). As another example, the monitoring window may include the nominal paging block (K) and the extended monitoring window, where the extended monitoring window includes two paging blocks immediately before the nominal paging block (X=K−2 and K−1).

In other embodiments, the extended monitoring window includes one or more non-adjacent paging blocks such that one or more unmonitored paging blocks occur between the nominal paging block and the additional block(s) of the extended monitoring window. As one example, the monitoring window may include the nominal paging block (K) and the extended monitoring window, where the extended monitoring window includes a non-adjacent paging block before the nominal paging block (X=K−2) and a non-adjacent paging block after the nominal paging block (Y=K+2) (but need not include adjacent paging blocks (K−1) and (K+1)).

The number and/or sequence of additional paging blocks may be pre-configured determined dynamically. In some embodiments, wireless communication device 110 selects the number of additional paging blocks relative to the length of the paging cycle. As an example, if the paging cycle has a periodicity of once per day, then wireless communication device 110 could monitor 1 additional paging block. If the periodicity of the paging cycle increases to once per week, then wireless communication device 110 could increase the number of additional paging blocks to monitor to 2 (or more) paging blocks.

At step 712, wireless communication device 110 communicates an extended monitoring window indicator to core network node 130/core network node 130 receives the extended monitoring window indicator from wireless communication device 110. The extended monitoring window indicator may be communicated using NAS signaling. In some embodiments, wireless communication device 110 communicates the indicator during registration procedures. Examples of registration procedures include ATTACH, ROUTING AREA UPDATE, LOCATION AREA UPDATE, TRACKING AREA UPDATE, and so on. The extended monitoring window indicator informs core network node 130 that wireless communication device 110 is capable of using the extended monitoring window.

The extended monitoring window indicator indicates the additional paging blocks of the extended monitoring window. As an example, the extended monitoring window indicator indicates the number of additional paging blocks of the extended monitoring window. In some embodiments, the indicator also indicates the position of the additional paging blocks. The position could be before the nominal paging block, after the nominal paging block, or both. The position could be consecutive or non-consecutive with respect to the nominal paging block or with respect to other additional paging blocks of the extended monitoring window. Continuing with the first example described with respect to step 708, the indicator would inform core network node 130 that wireless communication device 110 is capable of monitoring paging blocks K−1, K, and K+1.

In some embodiments, wireless communication device 110 optionally communicates an extended monitoring window timer to core network node 130. The extended monitoring window timer is associated with the extended monitoring window indicator and specifies the time period for which wireless communication device 110 uses the extended monitoring window. After the timer expires, wireless communication device 110 stops using the extended monitoring window and begins using the non-extended monitoring window. The non-extended monitoring window includes the nominal paging block K and excludes the additional paging blocks, such as K−1 and K+1.

The timer may be used by devices 110 using legacy non-discontinuous reception (non-DRX) mode (e.g., legacy paging cycles) and/or devices using extended non-DRX mode (e.g., long paging cycles). The extended monitoring window timer may be set to any suitable length of time. In some embodiments, the length of time is determined based on the frequency/periodicity of the monitoring window. For example, the timer could be set such that wireless communication device 110 monitors 1, 2, or n paging cycles using the extended monitoring window. Thus, in some embodiments, the timer is set longer for devices 110 using longer paging cycles.

In some embodiments, the extended monitoring window timer is communicated during NAS signaling. The timer may be communicated during registration procedures. The extended monitoring window indicator and the extended monitoring window timer may be communicated in the same message (e.g., both could be communicated in step 712), or the extended monitoring window timer could be communicated in a separate message (as illustrated in step 716 of FIG. 7A).

Alternatively, the extended monitoring window timer can be pre-configured and, thus, need not be negotiated/exchanged in a message. In some embodiments, the length of the timer can be configured by Operation and Maintenance (O&M) in the core network and known by wireless communication device 130 through the means of System Information (which may require configuration through O&M in the radio access network) or through a device management protocol such as that specified by the Open Mobile Alliance (OMA) Device Management (DM) Working Group. Even with this approach, wireless communication device 110 can still use registration procedures (or other suitable procedures) to notify the core network about when it will start using an extended monitoring window. The core network starts the timer in response to the notification in some embodiments.

Although the preceding example describes using a timer to coordinate when to stop using the extended monitoring window, other techniques could be used. As an example, in some embodiments, if and when wireless communication device 110 determines to fall back to the non-extended monitoring window/stop using the extended monitoring window, device 110 may send a second indicator to core network node 130 to use the non-extended monitoring window rather than the extended monitoring window. The second indicator may be sent using NAS signaling and/or during registration. Wireless communication device 110 determines whether or not to use the extended monitoring window based on any suitable criteria, such as whether device 110 is currently capable of supporting and/or configured with a long paging cycle or whether the current battery life or other resources available at device 110 support the extended monitoring window.

Similarly, in some embodiments, core network node 130 could send an indicator to device 110 to fall back to legacy paging/to not use the extended monitoring window. As an example, if core network node 130 determines that base station system is lightly loaded/not congested, core network node 130 may decide that there is a high enough probability of successful paging during the nominal paging block that the extended monitoring window need not be used.

Continuing to FIG. 7B, at step 720, core network node 130 updates a core network status of the wireless communication device to indicate that the wireless communication device is capable of using the extended monitoring window and the additional blocks of the extended monitoring window (such as the number and/or position of additional paging blocks of the extended monitoring window). As an example, core network node 130 updates a profile associated with wireless communication device 110 and stored in an SGSN database, a home location register (HLR), a visitor location register (VLR), or other database.

At step 724, core network node 130 sends wireless communication device 110 a response message that responds to the request message of step 712. For example, if the request message of step 712 was a registration message (e.g., ATTACH, ROUTING AREA UPDATE, LOCATION AREA UPDATE, and TRACKING AREA UPDATE), the response message at step 724 would be the corresponding registration response. If core network node 130 supports the extended monitoring window, the response message includes bonus information in addition to the portion of the message that responds to the registration request. The bonus information indicates support for the extended monitoring window.

At step 728, wireless communication device 110 determines whether the response message received at step 724 indicates that core network node 130 supports the extended monitoring window. For example, if the response message does not include the bonus information, wireless communication device 110 determines that core network node 130 does not support the extended monitoring window and the method skips to step 760 below. If the response message includes the bonus information, wireless communication device 110 determines that core network node 130 supports the extended monitoring window and proceeds to step 732 to start the extended monitoring window timer (if an extended monitoring window timer is being used). After sending the response message at step 724, core network node 130 starts the extended monitoring window timer at step 736 (if an extended monitoring window is being used).

Continuing to FIG. 7C, as shown at step 740, prior to an expiry of the extended monitoring window timer, wireless communication device 110 monitors the paging channel of radio network node 120 using the extended monitoring window. Continuing with the earlier example, wireless communication device 110 monitors paging blocks K−1, K, and K+1 (at a periodicity determined by device 110's paging cycle) prior to the expiry of the extended monitoring window timer.

Prior to the expiry of the extended monitoring window timer, core network node 130 can send page requests to the base station system/radio network node 120 that indicate that the extended monitoring window is used by wireless communication device 110. As shown in step 744, the page requests from core network node 130 inform radio network node 120 which blocks are included in the monitoring window (e.g., K−1, K, K+1). At step 748, radio network node 120 sends page requests to wireless communication device 110 during paging blocks K−1, K, and/or K+1. That is, because the base station system may receive the page request message from core network node 130 shortly before device 110's nominal paging block, the base station system might send out some page requests using the extended monitoring window's paging block(s) that precede device 110's nominal paging block (e.g., K−1). The base station system could also send some page requests using device 110's nominal paging block (K) and/or the extended monitoring window's paging block(s) that follow device 110's nominal paging block (e.g., K+1).

At step 752 core network node 130 detects expiry of the extended monitoring window timer and at step 756 wireless communication device 110 detects expiry of the extended monitoring window timer. After the expiry of the extended monitoring window timer, wireless communication device 110 monitors the paging channel using its non-extended monitoring window (step 760). The non-extended monitoring window includes device 110's nominal paging block (K) and excludes the number of additional paging blocks of the extended monitoring window (in the preceding example, K−1 and K+1 would be excluded if device 110 is using a non-extended monitoring window instead of an extended monitoring window).

The periodicity with which wireless communication device 110 monitors the non-extended monitoring window corresponds to either a legacy paging cycle or a long paging cycle. Devices using a legacy paging cycle monitor the paging blocks according to a legacy specification, such as 3GPP TS 44.018 version 12.1.0 where the periodicity of the nominal paging block can be in the area of seconds. Devices using a long paging cycle monitor the paging channel less frequently than devices using the legacy paging cycle. For example, in a long paging cycle the periodicity of the nominal paging block can be in the area of hours, days, or weeks.

In some embodiments, wireless communication device 110 retains the same paging cycle after transitioning from the extended monitoring window to the non-extended monitoring window. So, if wireless communication device 110 monitored the extended monitoring window according to the legacy paging cycle, wireless communication device 110 would also monitor the non-extended monitoring window according to the legacy paging cycle. Similarly, if wireless communication device 110 monitored the extended monitoring window according to the long paging cycle, wireless communication device 110 would also monitor the non-extended monitoring window according to the long paging cycle.

In other embodiments, wireless communication device 110 uses a different paging cycle after transition from the extended monitoring window to the non-extended monitoring window. As an example, a wireless communication device 110 monitoring an extended monitoring window according to a long paging cycle could switch to monitoring a non-extended monitoring window according to a legacy paging cycle. Thus, when the amount of time between cycles is longer, more blocks would be monitored per cycle and when the amount of time between cycles is shorter, fewer blocks would be monitored per cycle. Alternatively, a wireless communication device 110 monitoring an extended monitoring window according to a legacy paging cycle could switch to monitoring a non-extended monitoring window according to a long paging cycle.

In some embodiments, wireless communication device 110 sends a paging cycle indicator to core network node 130 indicating whether a legacy paging cycle or a long paging cycle is used. The indicator could be a binary value (e.g., 0 for legacy paging cycle, 1 for long paging cycle, or vice versa) or a periodicity value (e.g., an amount of time between paging cycles). Wireless communication device 110 may send the paging cycle indicator with the extended monitoring window indicator in step 212 to indicate the periodicity with which wireless communication device 110 will monitor the nominal paging block and the additional blocks of the extended monitoring window. Wireless communication device 110 may also send the periodicity indicator (or a second periodicity indicator) with the extended monitoring window timer in step 212 (or step 216) to indicate the periodicity with which wireless communication device 110 will monitor the nominal paging block of the non-extended monitoring window (e.g., upon expiry of the extended monitoring window timer). Wireless communication device 110 may also send the periodicity indicator separately from the extended monitoring window indicator, for example, if wireless communication device 110 determines to continue to monitor the same number of paging blocks (e.g., K−1, K, K+1), but wants to change the monitoring periodicity from the long paging cycle to the legacy paging cycle (or vice versa). Finally, wireless communication device 110 need not send a paging cycle indicator, for example, if wireless communication device 110 determines to use the same paging cycle regardless of whether device 110 is using the extended monitoring window or the non-extended monitoring window.

After the expiry of the extended window timer, at step 764, core network node 130 updates the core network status of wireless communication device 110 to indicate that wireless communication device 110 is not capable of using the extended monitoring window. Core network node 130 updates the core network status in a manner similar to that described above with respect to step 720. Subsequent page requests that core network node 130 sends base station system/radio network node 120 (step 768) indicate that the extended monitoring window is not used by wireless communication device 110. The indication may be explicit (e.g., instruct radio network node 120 to use legacy paging/ nominal paging block K) or implicit (e.g., the absence of an extended monitoring window in the paging request implies that legacy paging/nominal paging block K should be used). At step 772, radio network node 120 pages wireless communication device 110 during nominal paging block of the non-extended monitoring window (paging block K) according to a paging cycle (long paging cycle or legacy paging cycle) being used by wireless communication device 110. The method then ends.

In general, in some embodiments, an MS sends an extended monitoring window indicator to an SGSN if the MS uses an extended monitoring window. The SGSN updates a status associated with the MS and, after that, the SGSN can send a page request to the base station subsystem (BSS) indicating that the MS supports early or late paging relative to the MS's nominal paging block. Using the extended monitoring window may increase the probability of successfully paging the MS with the payload to be delivered to the MS. The extended monitoring window may be especially useful for machine type devices with long sleep times (1 week, day, month, etc.) to make sure the page request gets through at the earliest opportunity.

The extended monitoring window indicator may be associated with an extended monitoring window timer. For example, the MS may send the extended monitoring window timer to the SGSN saying that the MS only supports extended window monitoring for a certain amount of time. As an example, the timer may say that the MS uses the extended monitoring window for 2 hours and after that the MS just uses a non-extended monitoring window where it only reads its nominal paging block.

Some embodiments of the disclosure may provide one or more technical advantages. As an example, in some embodiments, the probability of a successful paging procedure may be increased. This may be beneficial when the re-occurrence of the wireless communication device's nominal paging group is less frequent due to the use of long paging cycles. In addition, the amount of paging request related signaling sent from the core network to the radio access network can be kept to a minimum. For example, page request reject signaling from the BSS to the SGSN can include timer information to prevent the SGSN from repeating page requests too early (because the BSS does not have an infinite memory for storing pending page requests, the timer can be configured so that the SGSN waits to send page requests to the BSS until a time close to the next occurrence of the wireless communication device's page monitoring window). Thus, the SGSN need not send repeat page requests before the BSS can handle them, which may allow processing resources in both nodes to be conserved and the amount of bandwidth consumed by signaling on the link between these nodes can be reduced. A technical advantage of some embodiments may include sending messages over the radio interface with information that controls how the wireless communication device will look for future page request messages. Some embodiments may benefit from some, none, or all of these advantages. Other technical advantages may be readily ascertained by one of ordinary skill in the art.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set. Modifications, additions, or omissions also may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

The invention claimed is:

1. A radio network node comprising one or more processors and memory, the memory containing instructions executable by the one or more processors, whereby the radio network node is operable to:
   receive a page request from a core network node, the page request indicating to page a wireless communication device;
   determine a next occurrence of a monitoring window during which the wireless communication device monitors a paging channel associated with the radio network node;
   determine that an amount of time until the next occurrence of the monitoring window exceeds an amount of time that the radio network node can store the page request;
   discard the page request; and,
   send a response to the core network node, the response indicating that the radio network node discarded the page request without sending the page request to the wireless communication device, the response including a paging timer value that indicates when the core network node is to repeat the page request;
   wherein:
      the monitoring window corresponds to an extended monitoring window, the extended monitoring window comprising a number X of early paging blocks before a nominal paging block associated with the wireless communication device; and,
      the paging timer value causes the core network node to repeat the page request prior to the number X of early paging blocks preceding the next occurrence of the nominal paging block.

2. The radio network node of claim 1, wherein the paging timer value comprises an explicit time when the core network node is to repeat the page request.

3. The radio network node of claim 1, wherein the paging timer value comprises a delta between the time when the core network node receives the response and the time when the core network node is to repeat the page request.

4. The radio network node of claim 1, the paging timer value selected such that when the core network node repeats the page request to the radio network node, the radio network node has capacity to store the page request until the next occurrence of the monitoring window.

5. The radio network node of claim 1, wherein:
   the monitoring window corresponds to a nominal paging block associated with the wireless communication device; and,
   the paging timer value causes the core network node to repeat the page request prior to the next occurrence of the nominal paging block.

6. The radio network node of claim 1, further operable to:
   instruct the wireless communication device to use the extended monitoring window as the monitoring window by including a value for X in paging request messages sent using the nominal paging block or in system information.

7. The radio network node of claim 1, wherein the radio network node sets the paging timer value based on the load in the radio network node.

8. The radio network node of claim 1, further operable to:
   receive the repeat page request from the core network node;
   determine that the amount of time until the next occurrence of the monitoring window is less than the amount of time that the radio network node can store the page request;
   store the page request prior to the next occurrence of the monitoring window; and,
   page the wireless communication device during the next occurrence of the monitoring window.

9. The radio network node of claim 1, further operable to:
   receive the repeat page request from the core network node;
   determine that the monitoring window has a periodicity that corresponds to a long paging cycle;
   determine that, starting from the next occurrence of the monitoring window, the wireless communication device is to use a new monitoring window for a limited time period T1, the new monitoring window having a periodicity that corresponds to a legacy paging cycle; and, page the wireless communication device during the next occurrence of the monitoring window, wherein the paging request messages sent during the monitoring window include an indication of the time period T1 for which the wireless communication device is to use the new monitoring window.

10. A method in a radio network node, comprising:

receiving a page request from a core network node, the page request indicating to page a wireless communication device;

determining a next occurrence of a monitoring window during which the wireless communication device monitors a paging channel associated with the radio network node;

determining that an amount of time until the next occurrence of the monitoring window exceeds an amount of time that the radio network node can store the page request;

discarding the page request; and, sending a response to the core network node, the response indicating that the radio network node discarded the page request without sending the page request to the wireless communication device, the response including a paging timer value that indicates when the core network node is to repeat the page request;

wherein:
the monitoring window corresponds to an extended monitoring window, the extended monitoring window comprising a number X of early paging blocks before a nominal paging block associated with the wireless communication device; and,
the paging timer value causes the core network node to repeat the page request prior to the number X of early paging blocks preceding the next occurrence of the nominal paging block.

11. The method of claim 10, wherein the paging timer value comprises an explicit time when the core network node is to repeat the page request.

12. The method of claim 10, wherein the paging timer value comprises a delta between the time when the core network node receives the response and the time when the core network node is to repeat the page request.

13. The method of claim 10, the paging timer value selected such that when the core network node repeats the page request to the radio network node, the radio network node has capacity to store the page request until the next occurrence of the monitoring window.

14. The method of claim 10, wherein:
the monitoring window corresponds to a nominal paging block associated with the wireless communication device; and,
the paging timer value causes the core network node to repeat the page request prior to the next occurrence of the nominal paging block.

15. The method of claim 10, further comprising:
instructing the wireless communication device to use the extended monitoring window as the monitoring window by including a value for X in paging request messages sent using the nominal paging block or in system information.

16. The method of claim 10, wherein the paging timer value selected based on the load in the radio network node.

17. The method of claim 10, further comprising:
receiving the repeat page request from the core network node;
determining that the amount of time until the next occurrence of the monitoring window is less than the amount of time that the radio network node can store the page request;
storing the page request prior to the next occurrence of the monitoring window; and,
paging the wireless communication device during the next occurrence of the monitoring window.

18. The method of claim 10, further comprising:
receiving the repeat page request from the core network node;
determining that the monitoring window has a periodicity that corresponds to a long paging cycle;
determining that, starting from the next occurrence of the monitoring window, the wireless communication device is to use a new monitoring window for a limited time period T1, the new monitoring window having a periodicity that corresponds to a legacy paging cycle; and,
paging the wireless communication device during the next occurrence of the monitoring window, wherein the paging request messages sent during the monitoring window include an indication of the time period T1 for which the wireless communication device is to use the new monitoring window.

19. A core network node comprising one or more processors and memory, the memory containing instructions executable by the one or more processors, whereby the core network node is operable to:
send a page request to a radio network node, the page request indicating to page a wireless communication device;
receive a response that instructs the core network node to repeat the page request according to a paging timer value;
set a paging timer based on the paging timer value; and,
send the repeat page request to the radio network node in response to the expiry of the paging timer;
wherein the paging timer value comprises a delta between the time when the core network node receives the response and the time when the core network node is to repeat the page request.

20. The core network node of claim 19, wherein the paging timer value comprises an explicit time when the core network node is to repeat the page request.

21. A method in a core network node, comprising:
sending a page request to a radio network node, the page request indicating to page a wireless communication device;
receiving a response that instructs the core network node to repeat the page request according to a paging timer value;
setting a paging timer based on the paging timer value; and,
sending the repeat page request to the radio network node in response to the expiry of the paging timer;
wherein the paging timer value comprises a delta between the time when the core network node receives the response and the time when the core network node is to repeat the page request.

22. The method of claim 21, wherein the paging timer value comprises an explicit time when the core network node is to repeat the page request.

* * * * *